(12) United States Patent
Zhang et al.

(10) Patent No.: US 12,141,146 B2
(45) Date of Patent: Nov. 12, 2024

(54) QUERY EXPRESSION RESULT CACHING USING DYNAMIC JOIN INDEX

(71) Applicant: Teradata US, Inc., San Diego, CA (US)

(72) Inventors: Ming Zhang, Rolling Hills Estates, CA (US); Sanjay Nair, El Segundo, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/089,833

(22) Filed: Dec. 28, 2022

(65) Prior Publication Data

US 2024/0220501 A1 Jul. 4, 2024

(51) Int. Cl.
| | | |
|---|---|---|
| *G06F 16/24* | (2019.01) | |
| *G06F 11/34* | (2006.01) | |
| *G06F 16/22* | (2019.01) | |
| *G06F 16/2453* | (2019.01) | |

(52) U.S. Cl.
CPC .... *G06F 16/24544* (2019.01); *G06F 11/3419* (2013.01); *G06F 16/2272* (2019.01); *G06F 16/24539* (2019.01)

(58) Field of Classification Search
CPC ........... G06F 16/24544; G06F 11/3419; G06F 16/2272; G06F 16/24539
See application file for complete search history.

(56) References Cited

U.S. PATENT DOCUMENTS

| | | | | |
|---|---|---|---|---|
| 6,618,719 | B1 * | 9/2003 | Andrei | G06F 16/24547 |
| 7,702,610 | B2 * | 4/2010 | Zane | G16H 50/70 |
| | | | | 707/999.001 |
| 8,825,629 | B2 * | 9/2014 | Lawande | G06F 16/217 |
| | | | | 707/713 |
| 9,135,299 | B2 * | 9/2015 | Burger | G06F 16/245 |
| 10,372,706 | B2 * | 8/2019 | Chavan | G06F 12/0802 |
| 11,188,538 | B2 * | 11/2021 | Sinclair | G06F 16/248 |
| 2006/0218123 | A1 * | 9/2006 | Chowdhuri | G06F 16/24532 |
| 2008/0172353 | A1 * | 7/2008 | Lim | G06F 16/24564 |
| | | | | 707/E17.014 |
| 2008/0256024 | A1 * | 10/2008 | Downer | G06F 16/24542 |
| 2012/0179669 | A1 * | 7/2012 | Al-Omari | G06F 16/24524 |
| | | | | 707/E17.131 |
| 2022/0050843 | A1 * | 2/2022 | Hu | G06F 16/24524 |
| 2022/0092069 | A1 * | 3/2022 | Hartsing | G06F 16/24544 |

* cited by examiner

*Primary Examiner* — Merilyn P Nguyen
(74) *Attorney, Agent, or Firm* — James Stover

(57) ABSTRACT

An apparatus, method and computer program product for query optimization in a Relational Database Management System (RDBMS), wherein an optimizer accesses a query expression repository (QER) storing planning and execution information for QEs from previous queries, wherein the QEs comprise table relations, intermediate results and/or final results of operations in the previous queries. Additionally, dynamic join indexes representing QE results are created for high-value QEs selected from the QER and maintained within a DJI repository. During query plan creation for a current or subsequent query, the optimizer searches the QER and DJI repository for DJIs created for high-value QEs corresponding to QEs contained in the current or subsequent query. DJIs corresponding to the matching QEs are used in the query planning phase to rewrite the current or subsequent user query so that stored QE results are used to answer QEs contained in the current or subsequent query.

14 Claims, 7 Drawing Sheets

QUERY EXPRESSION RESULT CACHING USING DYNAMIC JOIN INDEX

FIELD OF THE INVENTION

This invention relates to methods and techniques for query optimization in relational database management systems.

BACKGROUND OF THE INVENTION

Computer systems implementing a Relational Database Management System (RDBMS) using Structured Query Language (SQL) statements are well known in the art. In a relational database, data is stored into tables, wherein the tables are at least two dimensional, consisting of rows and columns. SQL statements may be formulated as queries, among other operations, to select rows of the tables by specifying one or more query expressions (QEs) that perform logical operations on the data in one or more of the columns.

A number of optimization techniques have been developed for minimizing the time required to perform these logical operations. An apparatus, method and computer program product for query optimization in a RDBMS, wherein an optimizer accesses a Query Expression Repository (QER), so that the optimizer learns from previous versions of the queries to improve current and subsequent versions of the queries, is described in U.S. patent application Ser. No. 16/728,387, filed Dec. 27, 2019; U.S. Publication Number 2021/0056106 A1, published Feb. 25, 2021; entitled "QUERY EXPRESSION REPOSITORY" by Grace Kwan-On Au, Nobul Reddy Goli, Vivek Kumar, Ming Zhang, Bin Cao, Sanjay Nair, Kanaka Durga Rajanala, Sanjib Mishra, Naveen Jaiswal, Lu Ma and Xiaorong Luo; incorporated by reference herein.

The QER stores planning and execution information for QEs from the previous versions of the queries, wherein the QEs comprise table relations, intermediate results and/or final results of operations. The optimizer searches the QER for QEs, and uses information from the QEs stored in the QER when optimizing the current and subsequent versions of the queries. The QEs are stored in the QER with a QE identifier; an operation performed; one or more source identifiers associated with the operation; and operation-specific information such as frequency of use, projections and conditions. The optimizer searches the QER for the QEs based on the operation, source identifiers, projections and conditions. The QEs may be stored in the QER in an order that the optimizer plans the operations, namely, a bottom-up order represented by QE trees.

The QER is managed by a QER manager that uniquely identifies each of the QEs in the QER and increments a frequency for each of the QEs based on how often each of the QEs is referenced in previous, current and subsequent versions of the queries.

However, there is still a need in the art for additional optimization techniques. The present invention provides improvements in the use of a query expression repository in query optimization.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Initially, it is noted that specific embodiments and sample implementations for various aspects of the invention are provided in detail the U.S. Provisional Application No. 62/246,653, which is incorporated by reference in its entirety herein.

Figure 1:
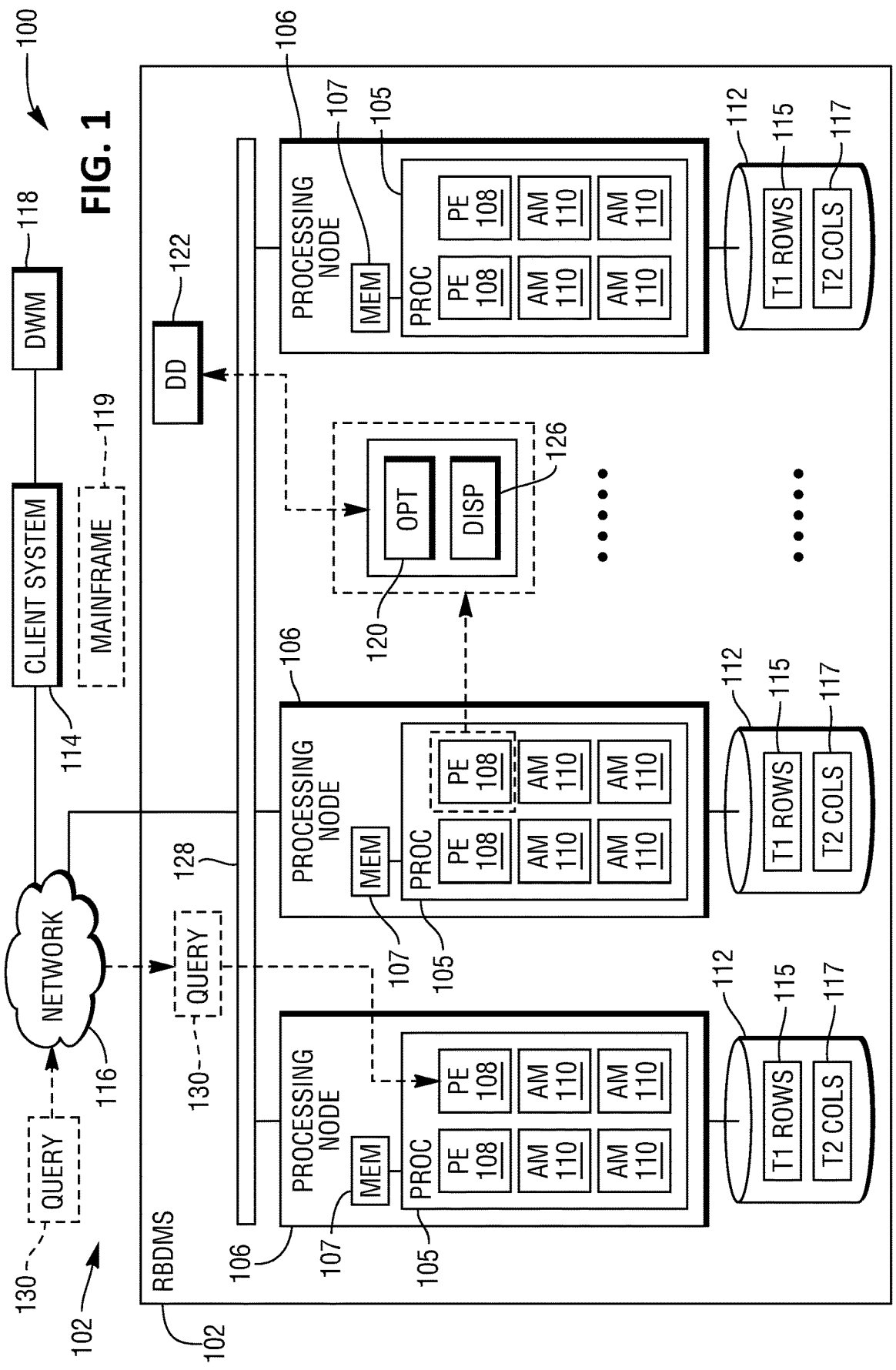
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing units such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access module processors (AMPS), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RBDMS 102 stores data in one or more tables in the DSFs 112. In one example, the database system 100 may be configured to distribute rows across access modules 110 and their associated DSFs 112 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to associated access modules 110 by a hash bucket map. The characteristics of the columns chosen for the primary index determine how evenly the rows are distributed. Alternatively, rows read from external sources may be randomly distributed to access modules 110 or, if internal sources, rows can be locally copied, randomly distributed, or hashed distributed to access modules 110.

For an access module 110, rows of each stored table may be stored DSFs 112, such as rows 115 to table T1 and columns 117 of table T2. The rows may be partitioned by row and/or column. Partitioning by rows is determined by one or more user-specified partitioning expressions. Partitioning by column is determined by user-specified grouping of one or more columns into each column partition. Each parsing engine module 108 may organize the storage of data and the distribution of table rows and columns. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may employ an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 122 may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g, processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally, or alternatively, more than one channel may also allow distributed communication to reduce the possibility of an undesired level of communication congestion among processing nodes 106.

Figure 2:
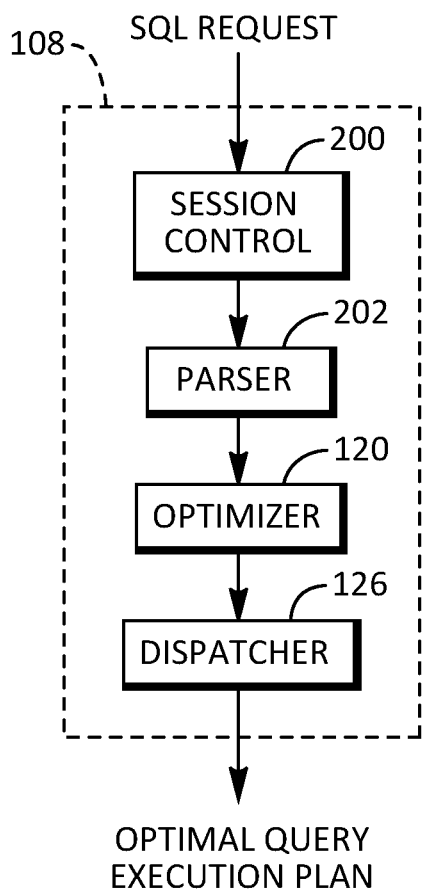
FIG. 2 is a block diagram of a parsing engine module 108 within the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
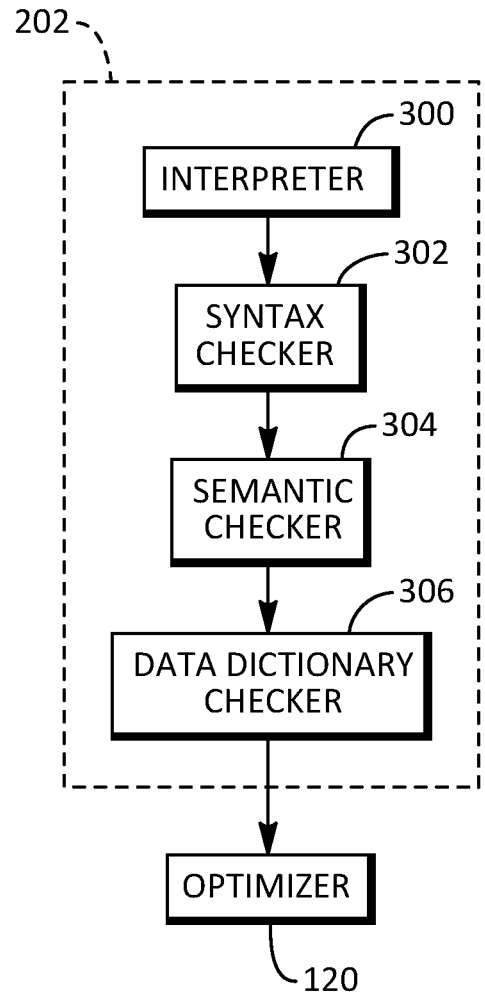
FIG. 3 is a block diagram of a parser module 202 within the parsing engine module of FIG. 2.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the optimal query execution plan to perform the request, and the dispatcher 126 coordinates the runtime execution of executable steps of the query execution plan of the optimizer module 120 with the access modules 110.

Figure 4:
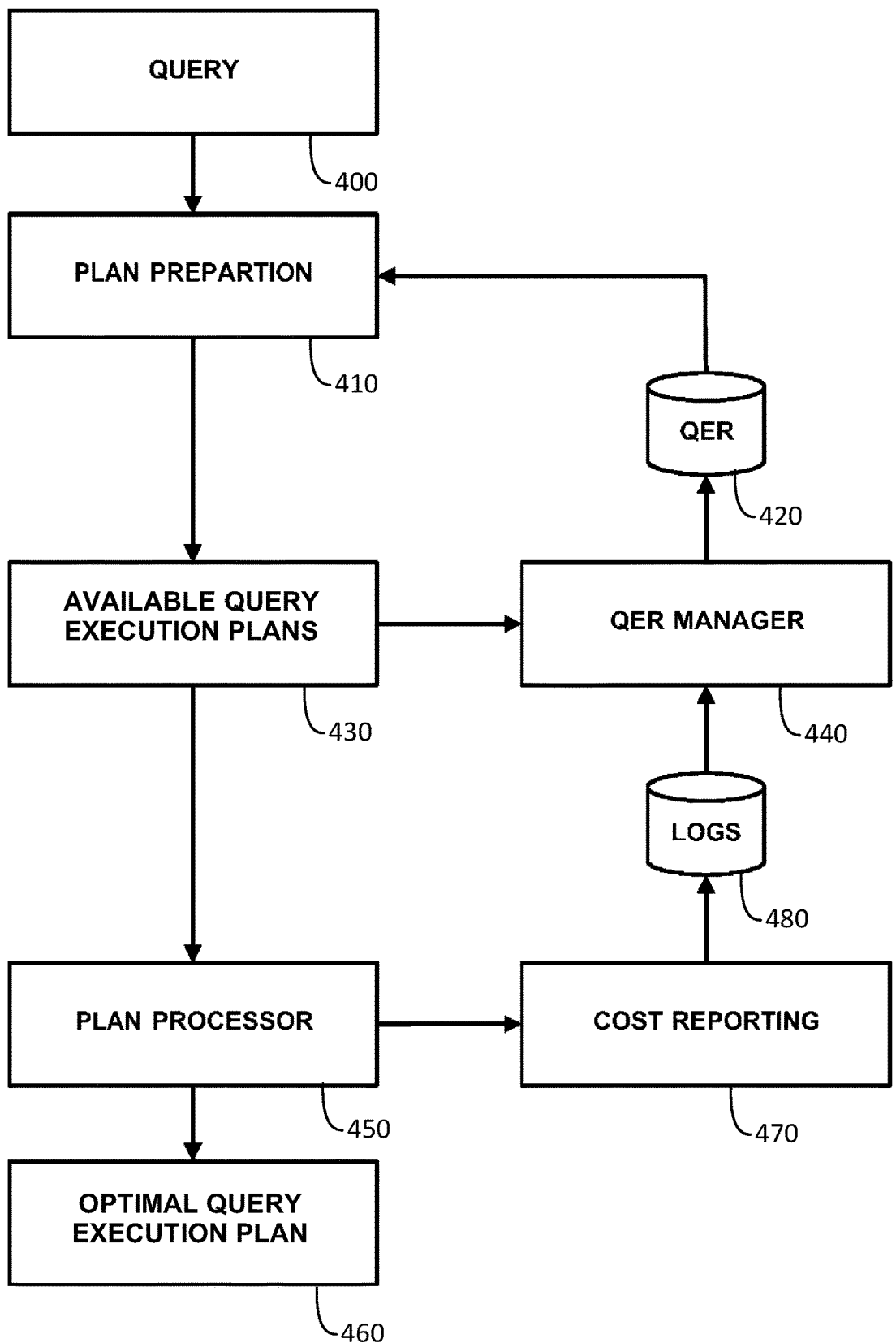
FIG. 4 illustrates an exemplary set of functions performed by optimizer 120 when generating query execution plans for a query.

FIG. 4 further illustrates an exemplary set of functions performed by the optimizer 120 when generating and selecting an optimal query execution plan for execution by the RDBMS 102. First, the query 400 is presented for plan preparation 410, wherein the query 400 is analyzed to identify the QEs therein. The plan preparation 410 of the optimizer 120 then accesses a QER 420, which stores planning and execution information for QEs from previous queries, so that the optimizer 120 learns from the previous versions of queries to improve current and subsequent queries. Specifically, the plan preparation 410 of the optimizer 120 searches the QER 420 for corresponding QEs, and uses information from the QEs stored in the QER 420 when optimizing current and subsequent queries 400. Moreover, once available query execution plans 430 are generated by the plan preparation 410, they may be used by a QER manager 440 to update the QER 420.

The available query execution plans 430 are presented to a plan processor 450, which selects an optimal query execution plan 460 for execution from among the available query execution plans 430, based on predetermined criteria such as estimated cost information. During execution of the optimal query execution plan 460, the plan processor 450 may also collect actual cost information, wherein a cost reporting function 470 stores the actual cost information in one or more logs 480. The QER manager 440 may also store the actual cost information, as well as other information, in the QER 420. Thereafter, the actual cost information is available for use by the plan preparation 410 when computing the estimated cost of performing the query execution plans 460. Thus, the processing of the query 400 and the resulting optimal query execution plans 460 form a feedback loop.

The QER 420 is managed by the QER manager 440, which uniquely identifies each of the QEs in the QER 420 and increments a frequency for each of the QEs based on how often each of the QEs is referenced in the previous, current and subsequent queries 400.

When a QE is logged into the QER 420, the QER manager 440 first checks whether the QE matches an existing QE in the QER 420. If a match is not found, a new QE entry with a frequency of one is added to the QER 420, and the new QE entry is assigned a QE ID that uniquely identifies the QE within the QER 420. If a match is found, the QER manager 440 simply increments frequency of the found entry by one.

Thereafter, QE matching is a light-weight process where the optimizer 120 searches the QER 420 for the QEs based on the operation, source identifiers, projections and conditions.

Additional details concerning the use of a query expression repository when optimizing current and subsequent queries is provided in commonly-assigned U.S. patent application Ser. No. 16/728,387; U.S. Publication Number 2021/0056106 A1, referenced above.

In database management systems, such as those provided by Teradata Corporation, a large number of user queries are run daily, with many queries sharing common query expressions. A Query Expression, or QE for short, is a partial query, e.g., a base table retrieval with single-table conditions, an aggregation on a base table, a join result of multiple tables, etc. Consider the following pair of queries A and B, where queries A and B share a query expression C:

Query_A: sel . . . from t1, t2 where t1·a1=t2·a2 and t2·b2=10;

Query_B: sel . . . from t2, t3 where t2·a2=t3·a3 and t2·b2=10;

Query Expression C is: retrieve t2 where t2·b2=10

If base table t2 is not changed between the executions of query A and query B, the result of QE C should be same for A and B, but it is computed twice. In general, if a QE is shared by N queries, and the base tables involved in the QE are not changed between the executions of these N queries, theoretically N−1 computations of the QE result are redundant work. By caching the results of the query expression, the redundant computations are avoided with the reuse of the saved query expression results to answer subsequent queries, thus improving subsequent query performance.

Figure 5:
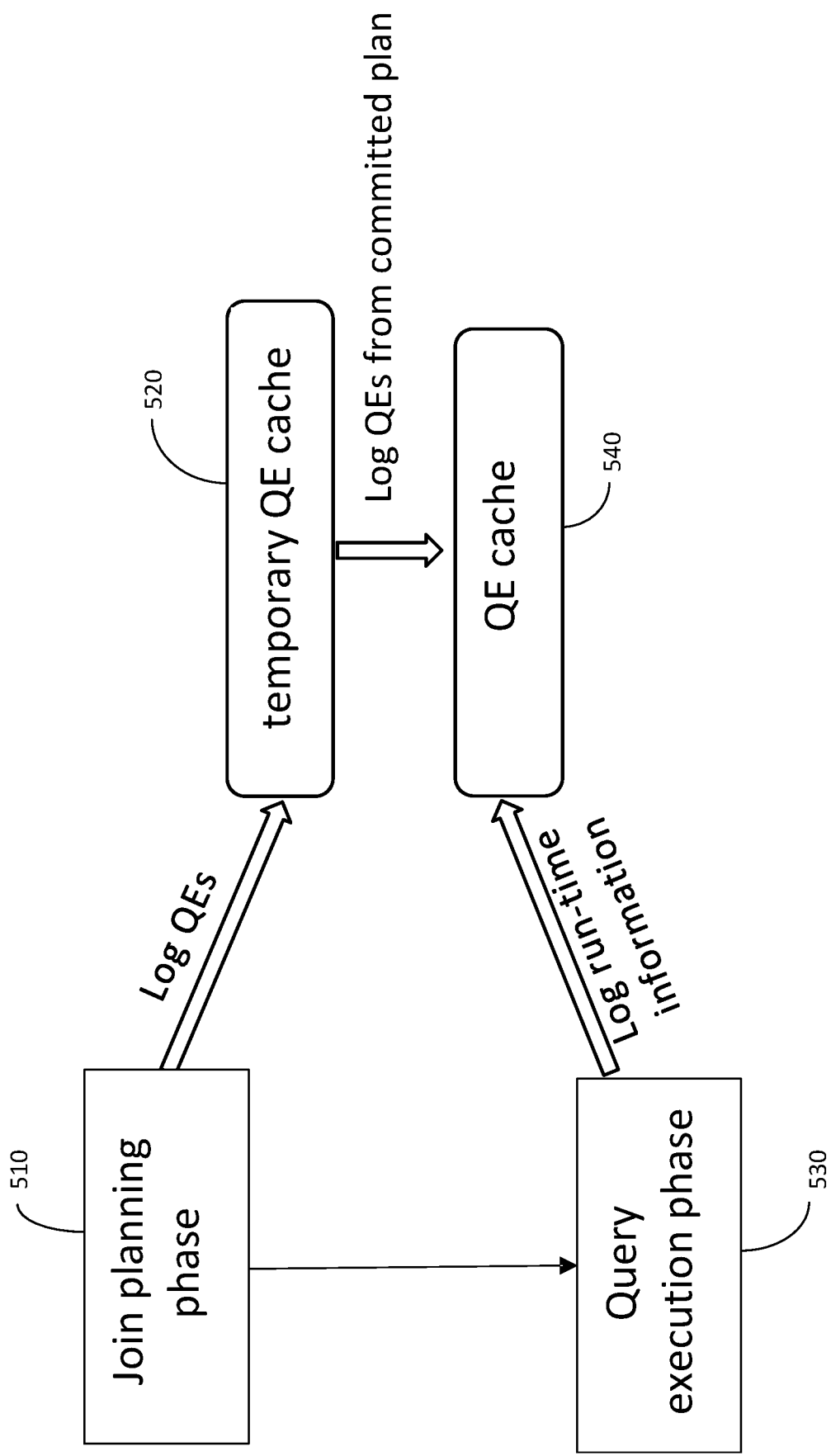
FIG. 5 illustrates a process for caching query expressions in a Query Expression Repository.

The process of caching query expressions in a QER is illustrated in FIG. 5. In FIG. 5, the QER includes a temporary QE cache 520 and QE cache 540. During query planning phase 510, all QEs are logged in temporary QER cache 520. During the query execution phase 530, QEs contained in the committed execution plan, referred to as the optimal query execution plan in FIG. 4, are logged to QE cache 540. The Query Expression Repository also maintains run-time information associated with the QEs from committed plans in QE cache 540. For example, consider the following query: Sel count(*) from t1, t2, t3 where a1=a2 and b2=b3 and c2>10.

Figure 6:
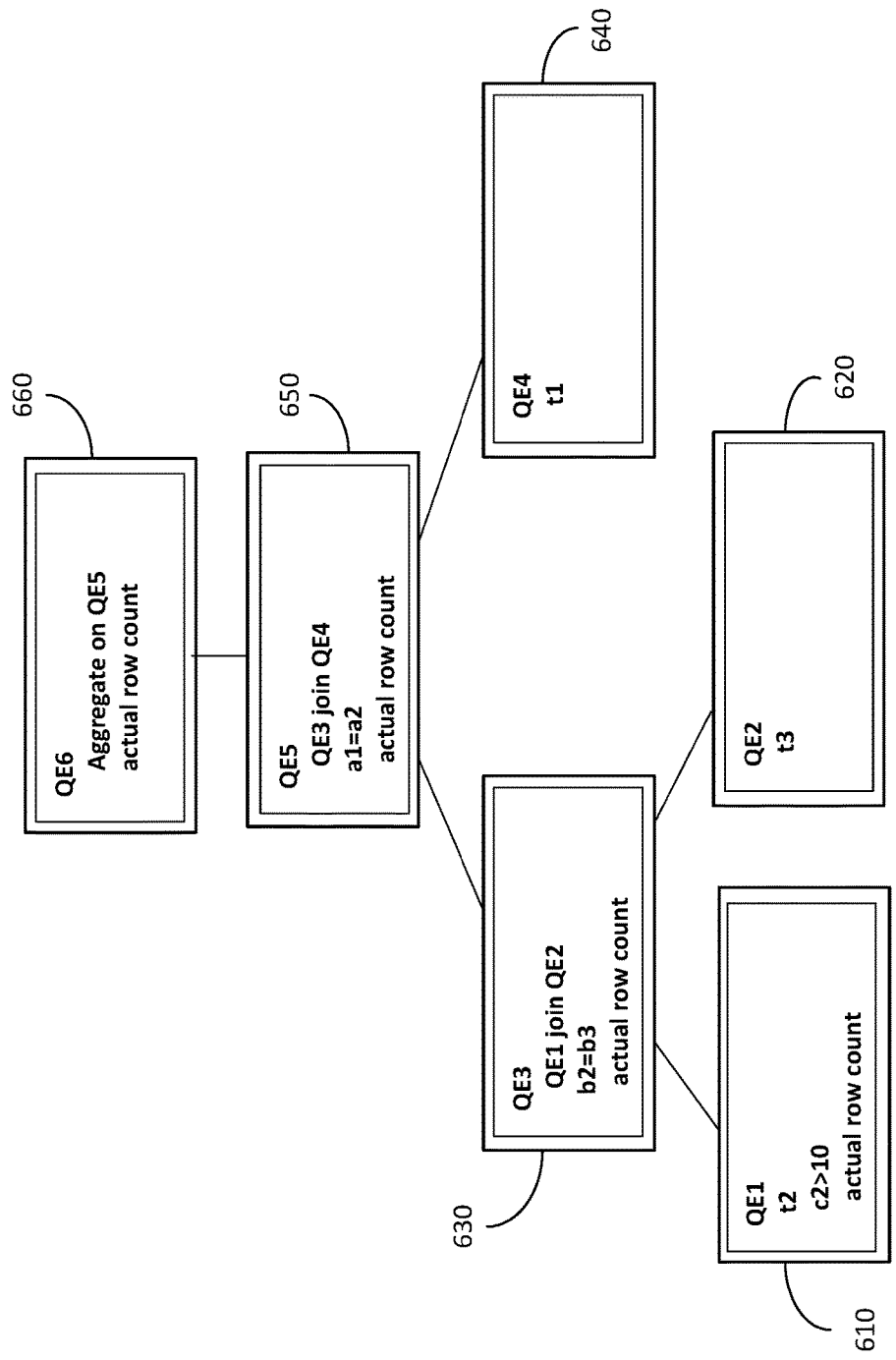
FIG. 6 is a diagram of a query expression tree containing multiple query expressions logged in the Query Expression Repository of FIG. 5

The resulting QEs, labeled as QE1, QE2, QE3, QE4, QE5, and QE6, are logged in the QER caches as shown in FIG. 5. In addition, QE1 through QE6 form a QE tree as shown in FIG. 6. A QE tree is a representation of a query, where the QEs that form the parts of the query are represented as nodes in a tree structure. Multiple QE trees may be possible for a query. The QEs that form the tree illustrated in FIG. 6 are evaluated from bottom to top to determine the cost of query execution.

Assume the committed plan for the above query is:

Retrieve t2 on c2>10, save result in spool 2 (node 610, QE1), Retrieve t3 (node 620, QE2), Join spool 2 and t3, save result in spool 3 (node 630, QE3), Retrieve t1 (node 640, QE4), Join spool 3 and t1, save result in spool 4 (node 650, QE5), and Aggregate on spool 4, save result in spool 1 (node 660, QE6).

The QER logs four QEs corresponding to the query blocks that produce results in spool 2, spool 3, spool 4 and spool 1, respectively. Each QE records its relations, fields, operators, retrieve/join conditions, etc. In addition, the QER also logs its computation cost, result size and frequency, i.e., the number of times it occurs.

The QE logging process is closely integrated with the optimizer. As the optimizer generates and costs multiple plans, it caches the QEs from all plans during query planning phase into temporary cache 520. After the best plan is committed, the QEs from this committed plan are copied from temporary cache 520 to the QE cache 540. After the step corresponding to a QE is executed, the run-time information, e.g., row count of the result, is also logged to the QER. As illustrated in the above example, the QEs from a plan are inter-related, and these relationships are also logged.

QE cache 540 does not log duplicate QEs. The optimizer checks the QE cache for a matching QE before logging a new one.

Figure 7:
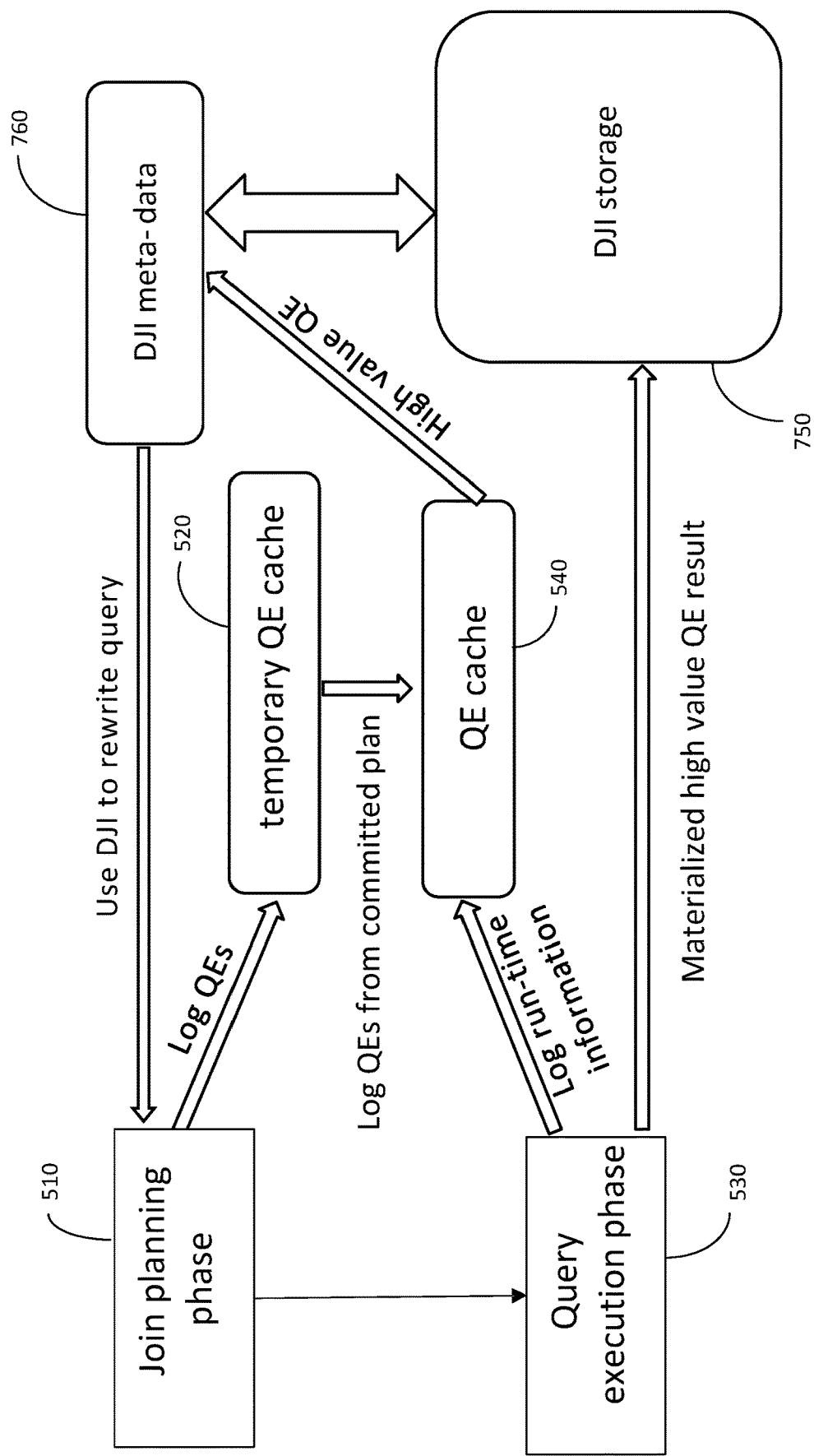
FIG. 7 illustrates an improved process for caching the results of query expressions as a dynamic join index, in accordance with an embodiment of the invention.

As caching itself has cost, it is not beneficial to cache results of all QEs. The following improved method for caching QE results as a dynamic join index, illustrated in the flow diagram of FIG. 7.

Log and manage QEs in a Query Expression Repository (QER);

For selected QEs with high "caching value," create and manage a Dynamic Join Index (DJI) as a form of result cache;

Manage the DJI meta-data and DJI usage history using a DJI cache;

Use the DJI to rewrite subsequent queries so as to re-use cached results; and

Light-weight DJI: make DJI invalid when a relevant base table is updated.

In the query planning phase, query expressions are collected/updated and saved in Query Expression Repository (QER) as discussed above and illustrated in FIG. 5. Whenever a matching QE is found in a new query, the frequency of this QE is updated and the "caching value" of this QE is evaluated to decide whether a Dynamic Join Index (DJI) should be created. The "caching value" of a QE is determined by the benefit the DJI brings to future queries and the cost of storing the DJI, i.e., the space usage. DJIs created for selected QEs with high "caching value" are saved to DJI Storage 750, and DJI meta-data and DJI usage history saved to cache 760.

The unit benefit of caching a QE can be defined as:

$$UnitBenefit(QE) = (QE\text{'s computing cost})/(QE\text{'s result size}),$$

where QE's computing cost is roughly the benefit brought by using the created DJI in a plan, and QE's result size is the size of the DJI table, which is in proportional to the cost of reading the DJI table.

The "caching value" of the QE is defined as:

$$cache\_value(QE) = UnitBenefit(QE) * frequency,$$

where frequency is the number of times the QE is found in user queries.

A DJI is created for a QE when the cache_value(QE) for the QE exceeds a set threshold, i.e., cache_value(QE)>threshold. This condition says "create DJI for frequent, expensive but small size QE". The threshold is dynamically determined based on factors like current average UnitBenefit and remaining space available for DJIs.

When the space limit for DJI is reached, an eviction policy decides which DJI is deleted, with lower value DJIs being deletion candidates. The value of a DJI can be defined as:

$$value\ (DJI) = UnitBenefit(DJI) * DJI\_frequency.$$

where UnitBenefit(DJI) is same value as its QE's UnitBenefit(QE), and DJI_frequency is the number of times the DJI is picked (for query rewrite) in committed plans.

The DJI cache manager maintains a min heap on value (DJI), each time a DJI is picked in a committed plan, its value is updated. At the time of eviction, the DJI with lowest value is deleted.

The definitions of QE and DJI values described above are presented as general concepts. In implementation, the definitions can be adjusted according to the system configuration and performance evaluation criteria; for example, it can be weighted by some other factors such as financial cost, or, in the case of less expensive storage, e.g., object storage, it may be advantageous to cache larger QE results.

DJI creation/deletion is performed by SQL engine in the plan of the user query that triggers this operation.

DJI creation only applies to QEs that are spooled in the user query plan. That is, the process does not re-compute the result, but uses the by-product of the query processing.

The usage of the DJI is also closely integrated to the optimizer. In the query planning phase, the DJIs are used in almost the same way as regular join indexes, i.e., materialized views, to rewrite the query. In other words, full use can be made of existing materialized view coverage and rewrite facilities. DJI usage also benefits non-exact matching of QEs in subsequent queries.

Figure 8:
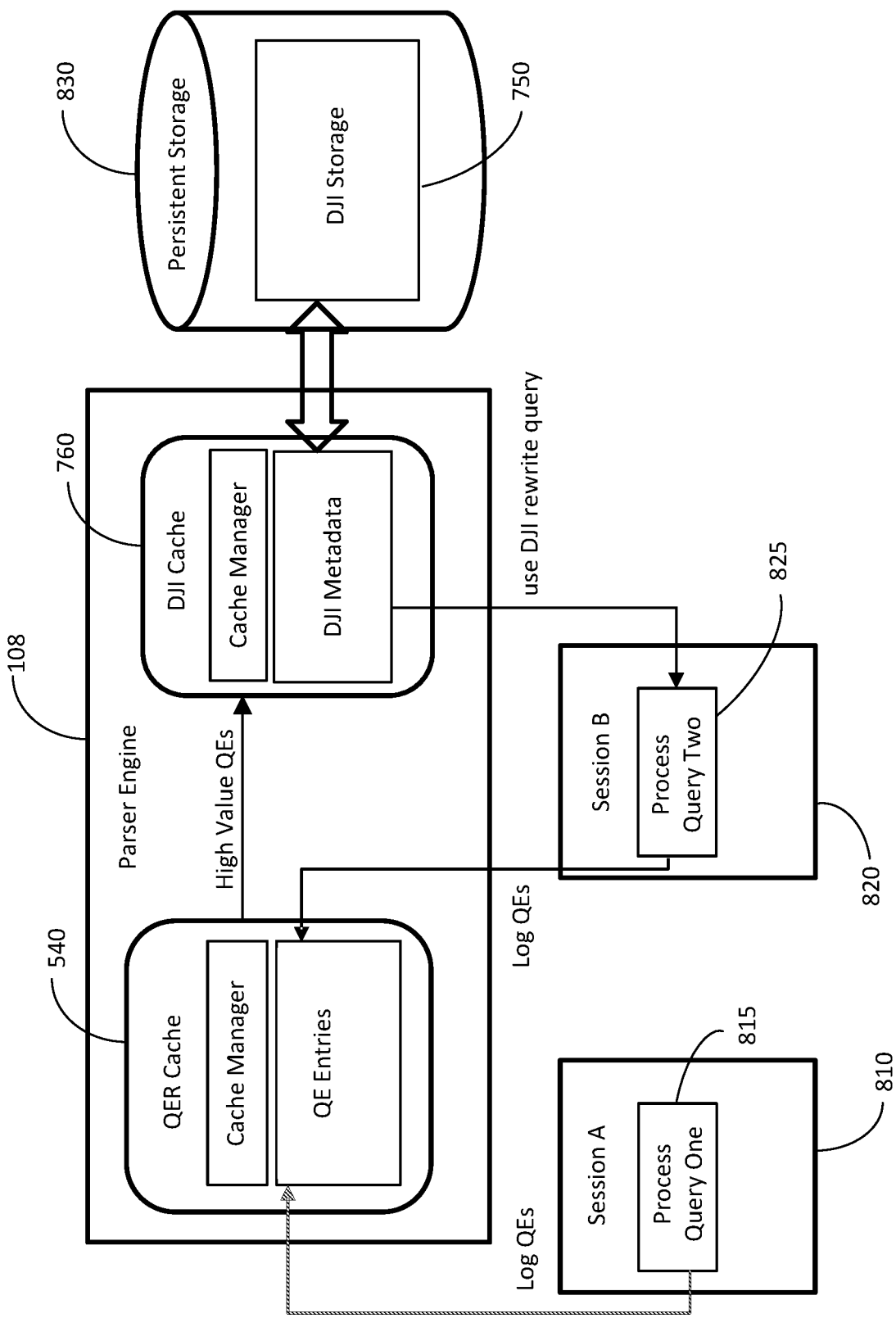
FIG. 8 is a high-level system architecture of a system for caching the results of query expressions as a dynamic join index, in accordance with an embodiment of the invention.

FIG. 8 provides a high-level architecture of a system for performing QE result caching. As illustrated, parser engine 108 includes QER Cache 540 and DJI Cache 760. QER Cache 540 includes a cache manager and cached QE entries. DJI Cache 760 includes a cache manager and cached DJI metadata. DJIs are stored in DJI storage 750 within a persistent storage 830.

Processes from two sessions, process query one 815 in session A 810 and process query two in session B 820, are shown logging QEs to QER cache 540. Process query two is shown receiving DJIs from DJI storage 750 and DJI cache 760.

In a parallel environment, multiple sessions may access DJIs concurrently. To avoid an access conflict to a DJI, e.g., when a DJI used by a plan in session A is deleted by session B, a mechanism to lock the DJI in the plan is needed. However, a regular locking protocol cannot be used on permanent tables. One proposed locking protocol for use in preventing access conflicts to DJIs is referred to as "Try-Lock." Using TryLock, the system will try to get a lock on an object several times. If the lock attempts fail, the DJI will not be used by the plan requesting the lock and an alternative no-DJI plan will be executed. The system may miss some opportunities for accessing DJIs, but the performance impact on user queries will be minimized.

There are some differences of the DJI usage from regular join index:

The no-DJI base plan is costed first and always included as alternative plan; in case the "TryLock" of the DJI plan fails, the engine executes the no-DJI plan.

Try DJIs rewrite only when the estimated execution cost of the no-DJI plan is much higher than the planning cost (ie parsing time) itself and above a threshold. This is to avoid the cases that increased parsing time is higher than the execution time reduction brought by the DJI.

The DJIs are not maintained as regular materialized views. When a base table is updated, all the DJIs defined on it become invalid and will be deleted.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented apparatus, comprising:
a relational database management system (RDBMS) executing in a computer system, wherein the RDBMS manages a relational database comprised of one or more tables storing data;
an optimizer for interpreting one or more queries comprised of one or more query expressions to generate one or more query execution plans for execution by the RDBMS; and
a Dynamic Join Index (DJI) repository for storing dynamic join indexes (DJIs) corresponding to query expressions having high cache values selected from previous queries; the cache value of a query expression being determined by evaluating benefit and cost of storing the query expression within the DJI repository;
wherein the optimizer when generating query execution plans for a current query searches the DJI repository for DJIs corresponding to query expressions contained in the current query; and uses DJIs read from said search to generate the query execution plans for the current query.

2. The apparatus of claim 1, further comprising a query expression repository for storing planning and execution information for previous queries, said planning and execution information including operation specific information for said previous queries, the operation specific information including query expression computing cost, query expression result size, and query expression frequency of use; and
wherein the cache value of a query expression selected from previous queries is determined by said optimizer from the operation specific information stored within said query expression repository.

3. The apparatus of claim 1, wherein said dynamic join indexes (DJIs) corresponding to query expressions selected from previous queries comprise materialized views containing query expression results corresponding to the query expressions selected from previous queries.

4. The apparatus of claim 1, further comprising a DJI cache for storing and managing metadata and usage history for the DJIs stored within said DJI repository.

5. A computer-implemented method, comprising:
executing a relational database management system (RDBMS) in a computer system, wherein the RDBMS manages a relational database comprised of one or more tables storing data;
interpreting one or more queries in an optimizer to generate one or more query execution plans for execution by the RDBMS, and
maintaining a Dynamic Join Index (DJI) repository for storing dynamic join indexes (DJIs) corresponding to query expressions having high cache values selected from previous queries; the cache value of a query expression being determined by evaluating benefit and cost of storing the query expression within the DJI repository;
wherein the optimizer when generating query execution plans for a current query searches the DJI repository for DJIs corresponding to query expressions contained in the current query; and uses DJIs read from said search to generate the query execution plans for the current query.

6. The method of claim 5, further comprising the step of:
storing planning and execution information for previous queries within a query expression repository, said planning and execution information including operation specific information for said previous queries, the operation specific information including query expression computing cost, query expression result size, and query expression frequency of use; and
wherein the cache value of a query expression selected from previous queries is determined by said optimizer from the operation specific information stored within said query expression repository.

7. The method of claim 5, wherein said dynamic join indexes (DJIs) corresponding to query expressions selected from previous queries comprise materialized views containing query expression results corresponding to the query expressions selected from previous queries.

8. The apparatus of claim 5, further comprising the step of:
maintaining a DJI cache for storing and managing metadata and usage history for the DJIs stored within said DJI repository.

9. A computer program product, the computer program product comprising a tangible, non-transitory, computer readable storage medium having program instructions embodied therewith, the program instructions executable by a computer system to cause the computer system to perform a method, comprising:
executing a relational database management system (RDBMS) in a computer system, wherein the RDBMS manages a relational database comprised of one or more tables storing data;
interpreting one or more queries in an optimizer to generate one or more query execution plans for execution by the RDBMS, and
maintaining a Dynamic Join Index (DJI) repository for storing dynamic join indexes (DJIs) corresponding to query expressions having high cache values selected from previous queries; the cache value of a query expression being determined by evaluating benefit and cost of storing the query expression within the DJI repository;
wherein the optimizer when generating query execution plans for a current query searches the DJI repository for DJIs corresponding to query expressions contained in the current query; and uses DJIs read from said search to generate the query execution plans for the current query.

10. The computer program product of claim 9, wherein the program instructions executable by a computer system further comprises the step of:
   storing planning and execution information for previous queries within a query expression repository, said planning and execution information including operation specific information for said previous queries, the operation specific information including query expression computing cost, query expression result size, and query expression frequency of use; and
   wherein the cache value of a query expression selected from previous queries is determined by said optimizer from the operation specific information stored within said query expression repository.

11. The computer program product of claim 9, wherein said dynamic join indexes (DJIs) corresponding to query expressions selected from previous queries comprise materialized views containing query expression results corresponding to the query expressions selected from previous queries.

12. The computer program product of claim 9, wherein the program instructions executable by a computer system further comprises the step of:
   maintaining a DJI cache for storing and managing metadata and usage history for the DJIs stored within said DJI repository.

13. A computer-implemented apparatus, comprising:
   a relational database management system (RDBMS) executing in a computer system, wherein the RDBMS manages a relational database comprised of one or more tables storing data;
   an optimizer for interpreting one or more queries comprised of one or more query expressions to generate one or more query execution plans for execution by the RDBMS;
   a Query Expression Repository (QER) for storing planning and execution information for previous queries, said planning and execution information including operation specific information for said previous queries, the operation specific information including query expression computing cost, query expression result size, and query expression frequency of use; and
   a Dynamic Join Index (DJI) repository for storing dynamic join indexes (DJIs) corresponding to query expressions having high cache value selected from query expressions stored in said QER; the cache value of a query expression selected from previous queries being determined by said optimizer from the operation specific information stored within said QER;
   wherein the optimizer when generating query execution plans for a current query searches the DJI repository for DJIs corresponding to query expressions contained in the current query; and uses DJIs read from said search to generate the query execution plans for the current query.

14. A computer-implemented method, comprising:
   executing a relational database management system (RDBMS) in a computer system, wherein the RDBMS manages a relational database comprised of one or more tables storing data;
   interpreting one or more queries in an optimizer to generate one or more query execution plans for execution by the RDBMS,
   maintaining a Query Expression Repository (QER) for storing planning and execution information for previous queries, said planning and execution information including operation specific information for said previous queries, the operation specific information including query expression computing cost, query expression result size, and query expression frequency of use; and
   maintaining a Dynamic Join Index (DJI) repository for storing dynamic join indexes (DJIs) corresponding to query expressions having high cache value selected from query expressions stored in said QER; the cache value of a query expression selected from previous queries being determined by said optimizer from the operation specific information stored within said QER;
   wherein the optimizer when generating query execution plans for a current query searches the DJI repository for DJIs corresponding to query expressions contained in the current query; and uses DJIs read from said search to generate the query execution plans for the current query.

* * * * *